US008209428B2

(12) United States Patent
Crampton (10) Patent No.: US 8,209,428 B2
(45) Date of Patent: *Jun. 26, 2012

(54) APPARATUS AND METHOD FOR PROVISIONING WIRELESS DATA COMMUNICATION DEVICES

(75) Inventor: Erwin Crampton, Merrimack, NH (US)

(73) Assignee: Tangoe, Inc., Orange, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,060

(22) Filed: Mar. 4, 2011

(65) Prior Publication Data

US 2011/0153763 A1   Jun. 23, 2011

Related U.S. Application Data

(63) Continuation of application No. 11/717,851, filed on Mar. 14, 2007, now Pat. No. 7,917,641.

(60) Provisional application No. 60/782,152, filed on Mar. 14, 2006.

(51) Int. Cl.
    *G06F 15/16*   (2006.01)
(52) U.S. Cl. ....................................... 709/229
(58) Field of Classification Search .................. 709/229, 709/203, 206, 227, 228; 370/310
    See application file for complete search history.

(56) References Cited

U.S. PATENT DOCUMENTS

| | | | |
|---|---|---|---|
| 6,356,905 B1 | 3/2002 | Gershman et al. | |
| 6,490,521 B2 | 12/2002 | Wiener | |
| 6,694,362 B1 | 2/2004 | Secor et al. | |
| 6,920,208 B1 | 7/2005 | Rosen et al. | |
| 6,983,375 B2 | 1/2006 | Zhang et al. | |
| 7,010,303 B2 | 3/2006 | Lewis et al. | |
| 7,239,877 B2 | 7/2007 | Corneille et al. | |
| 7,251,727 B2 | 7/2007 | Adams et al. | |
| 7,529,230 B2 | 5/2009 | Lewis et al. | |
| 2003/0007464 A1 | 1/2003 | Balani | |
| 2003/0232618 A1* | 12/2003 | Le et al. .................. | 455/412.2 |
| 2007/0130321 A1 | 6/2007 | O'Shaughnessy | |
| 2008/0051076 A1 | 2/2008 | O'Shaughnessy et al. | |
| 2008/0052383 A1 | 2/2008 | O'Shaughnessy et al. | |

FOREIGN PATENT DOCUMENTS

WO   2008024501 A2   2/2008

* cited by examiner

*Primary Examiner* — Krisna Lim
(74) *Attorney, Agent, or Firm* — St. Onge Steward Johnston & Reens LLC (57) ABSTRACT

A system for provisioning wireless data communication devices for a plurality of users is provided in which the system includes a configuration server having an authorization program and a configuration program, and a database. The configuration server is connectable to a network for providing a network portal for the plurality of users to 10 allow each of them to have a wireless data communication device provisioned. The authorization program validates which one of a plurality of wireless host servers a user is authorized to use. The configuration program is configured to provision the wireless data communication device to communicate with the one of a plurality of wireless host servers to obtain email from one of a plurality of messaging servers. The database is in communication with the configuration server for storing configurations for each of the wireless host servers.

20 Claims, 9 Drawing Sheets

1. 2. 3 Add Bulk Users

Sample Format → ┌─354  ┌─356  ┌─358  ┌─360
352 ─ FirstName, LastName, CellPhoneNbr, Username, Pwd
John, Smith, 6175551111, john.smith, password@341
Jane, Smith, 6175551112, jane.smith, password@341
Jack, Smith, 6175551113, jack.smith, password@341
Jessie, Smith, 6175551114, jessie.smith, password@341
Janice, Smith, 6175551115, janice.smith, password@341

APPARATUS AND METHOD FOR PROVISIONING WIRELESS DATA COMMUNICATION DEVICES

CROSS-REFERENCE TO RELATED APPLICATIONS

The present application is a continuation application of U.S. patent application Ser. No. 11/717,851, filed on Mar. 14, 2007, which claims the benefit under 35 U.S.C. §119(e) of the U.S. Provisional Patent Application Ser. No. 60/782,152, filed on Mar. 14, 2006, the contents of which are incorporated herein by reference.

FIELD OF THE INVENTION

This invention relates to system and method for provisioning wireless data communication devices.

BACKGROUND OF THE INVENTION

The use of wireless communication devices, such as a Blackberry device, a j2ME device or any windows mobile device, has increased dramatically during recent years. The use of such devices allows a person to access their email anywhere as long as they are within proximity of ail antennae in communication with the wireless host service for which the wireless communication device is configured. Since the use of these devices has increased dramatically, providers must make accommodations to have these wireless devices provisioned, which includes configuring the wireless device to communicate with the wireless host service. A large company that provides such devices to their employees must typically maintain an information technology (IT) department to manually provision each of their employees devices. Such a process dramatically increases the cost of using the devices since an IT department may need several employees to assist in manually configuring the devices.

To overcome the added expense in manually provisioning wireless communication devices, systems and methods for self provisioning these devices have been developed. Once such system for self provisioning a wireless communication device includes an Internet interface through which a user can access an interface of the wireless host server to provision their own device. This system also includes an authorization program to authorize that a particular user has the authorization to provision a wireless communication device with the wireless host server. A user that has the authorization to provision the device can then provision their wireless communication device to remotely send and receive email from a specific email exchange through the 10 wireless host service. One drawback of this prior art system is that a user can only provision the wireless communication device with one wireless host service. Thus, this system does not provide any flexibility to the user or a company in choosing the services that the system can provide for the wireless communication device. Another drawback of this prior art system is that it cannot perform auxiliary services such as creating user email accounts or installing other software on a user's wireless communication device.

Other problems may result from the manual provisioning and self provisioning of wireless communication devices, especially if a company uses these methods to provision a large number of devices to communicate through several wireless host services. With prior systems, each wireless host server may have to communicate with every email or messaging server that the company maintains, which can greatly reduce the amount of email that a system can process. Moreover, the more complicated the system, the more resources a company will have to devote in managing the wireless host servers and email servers.

SUMMARY OF THE INVENTION

It is therefore an object of this invention to provide an improved system and method for provisioning a plurality of wireless mobile communication devices.

It is a further object of this invention to provide such a system and method which provisions the wireless communication devices for one of a plurality of wireless host services.

It is a further object of this invention to provide such a system and method that optimizes communication between a plurality of wireless host servers and a plurality of email servers.

It is a further object of this invention to provide such a system and method that can provide auxiliary services such as installing software programs on the wireless communication devices.

The subject invention results from the realization that a more effective system and method for provisioning wireless communication devices is effected by a configuration manager program accessed through a network portal to allow a plurality of users to each provision a wireless mobile communication device to communicate with one of a plurality of wireless host servers to obtain email from one of a plurality of messaging servers.

This invention features a system for provisioning wireless data communication devices for a plurality of users, the system comprising: a configuration server connectable to a network for providing a network portal for the plurality of users to allow each of them to have a wireless data communication device provisioned, the configuration server including: an authorization program for validating which one of a plurality of wireless host servers a user is authorized to use, and a configuration program configured to provision the wireless data communication device to communicate with the one of a plurality of wireless host servers to obtain email from one of a plurality of messaging servers; and a database in communication with the configuration server for storing configurations for each of the plurality of wireless host servers.

In a preferred embodiment, the database may further include rules for each of the wireless host servers and the software code further includes a rules manager program for determining which wireless host server and which messaging server the wireless data communication device is to be provisioned for. There may be a plurality of wireless communication devices and each of the devices is configured to communicate with the same email server through one of the plurality of wireless host servers. The software may further include software configured to create and manage email accounts. The system may further include a plurality of remote terminals connected to the network for allowing administrators and the plurality of users to access the configuration manager. The system may further include the plurality of wireless host servers. The system may further include the plurality of messaging servers. The system may further include a plurality of interface modules, one associated with each of the wireless host servers, for interfacing the configuration server with each of the wireless host servers. The configuration manager program may configure the wireless data communication device to communicate with only one of a plurality of wireless host servers to obtain email from only one of a plurality of messaging servers. The plurality of messaging servers may each include an email server.

This invention also features a system for provisioning wireless data communication devices for a plurality of users, the system comprising: a configuration server connectable to a network for providing a network portal for the plurality of users to allow each of them to have a wireless data communication device provisioned, the configuration server including: a configuration program configured to provision the wireless data communication device to communicate with one of a plurality of wireless host servers to obtain email from one of a plurality of messaging servers, a rules manager program for determining which wireless host server and which messaging server the wireless data communication device is to be provisioned for; a plurality of interface module programs, one associated with each of the wireless host servers, for interfacing the configuration server with each of the wireless host servers; and a database in communication with the configuration server for storing configurations and rules for each of the plurality of wireless host servers. The plurality of messaging servers may each include an email server.

This invention also features a method for provisioning wireless data communication devices for a plurality of users, the system comprising: authenticating a user; authorizing the user to provision a wireless data communication device; determining which predetermined email server among a plurality of email servers for which the wireless data communication device should be provisioned; determining which wireless host server among a plurality of wireless host servers for which the wireless data communication device should be configured; and provisioning the wireless data communication device to communicate with the wireless host server to obtain email from the email server.

In a preferred embodiment, the step of determining which wireless host server includes applying rules to determine which wireless host server among a plurality of wireless host servers for which the wireless data communication device should be configured. The step of determining which wireless host server may include evaluating 5 the performance of the plurality of wireless host servers and the plurality of email servers. The method may further include the step of installing software on the wireless data communication devices. For example, the installed software might be selected from the group consisting of a global positioning system program, a dictionary program, a time sheets program, an expense reporting program; and a stock quotes program. The method may further include the step of monitoring the licenses of the software installed on the wireless data communication devices. The method may further include the step of obtaining Internet domain names for the users. The method may further include the step of emailing a user with instructions about how to configure a specific wireless data communication device. The method may further include configuring the wireless data 15 communication device to communicate using voice-over-Internet protocol. The method may further include allowing a user to change or reset a password. The method may further include allowing a user to erase software from the device. The method may further include allowing an administrator to access the configuration server through the network portal.

This invention also features an article of manufacture, comprising: a computer readable medium having computer readable program code for provisioning wireless data communication devices for a plurality of users, the computer readable program code executable on a computer system and including instructions for: causing the computer system to authenticate a user; causing the computer system to authorize the user to provision a wireless data communication device; causing the computer system to determine which predetermined email server among a plurality of email servers for which the wireless data communication device should be provisioned; causing the computer system to determine which wireless host server among a plurality of wireless host servers for which the wireless data communication device should be configured; and causing the computer system to provision the wireless data communication device to communicate with the wireless host server to obtain email from the email server.

In a preferred embodiment, the computer readable program code for causing the computer system to determine which wireless host server includes computer readable program code for causing the computer system to apply rules to determine which wireless host server among a plurality of wireless host servers for which the wireless data communication device should be configured. The computer readable program code for causing the computer system to determine which wireless host server may include computer readable program code for causing the computer system to evaluate the performance of the plurality of wireless host servers and the plurality of email servers. The computer readable program code may further include instructions for causing the computer system to email a user with instructions about how to configure a specific wireless data communication device.

BRIEF DESCRIPTION OF THE DRAWINGS

Other objects, features and advantages will occur to those skilled in the art from the following description of a preferred embodiment and the accompanying drawings, in FIG. 1 is a schematic block diagram of a prior art self provisioning system.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
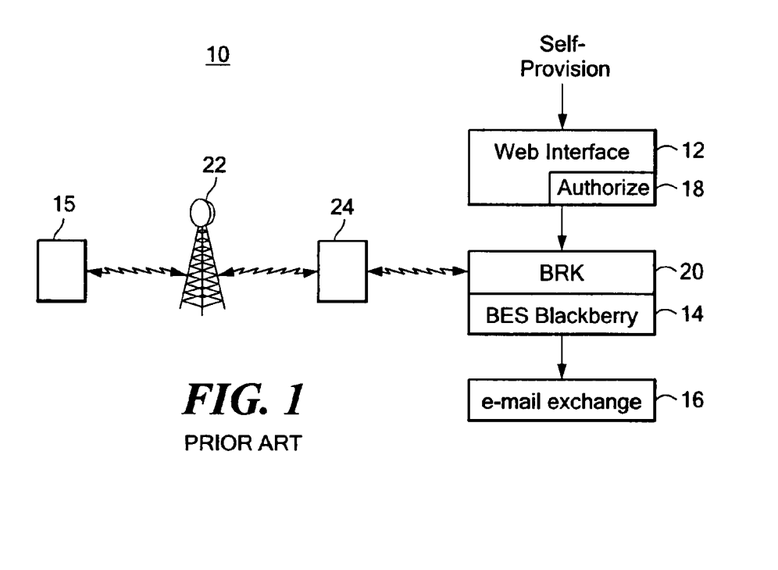

There is shown in FIG. 1 a prior art self provisioning system 10 that includes an Internet interface server 12 a wireless host server 14 and email exchange server 16. The 10 Internet interface server includes software thereon, such as an authorization program 18, for allowing a user to access the Internet interface providing the user has authority to self provision a wireless data communication device. Wireless host server 14 may be, for example, a Blackberry Enterprise Server (BES) and may include a Blackberry Resource Kit (BRK) programming interface 20 for allowing Internet interface server-12 to access wireless host server 14. When a user accesses an Internet interface 12 to self provision a wireless data communication device, interface 12 will communicate with BRK 20 on server 14 to configure the user's device 15 to access Blackberry server 14 and email exchange 16 by communicating wirelessly through an antennae 22 and a server 24. As described above, a disadvantage of this prior art self provisioning system is that a user can only provision a wireless device for a single host server 14. Moreover, prior art system 10 does not provide other functions such as creating email accounts or obtaining Internet domain addresses for the user.

Figure 2:
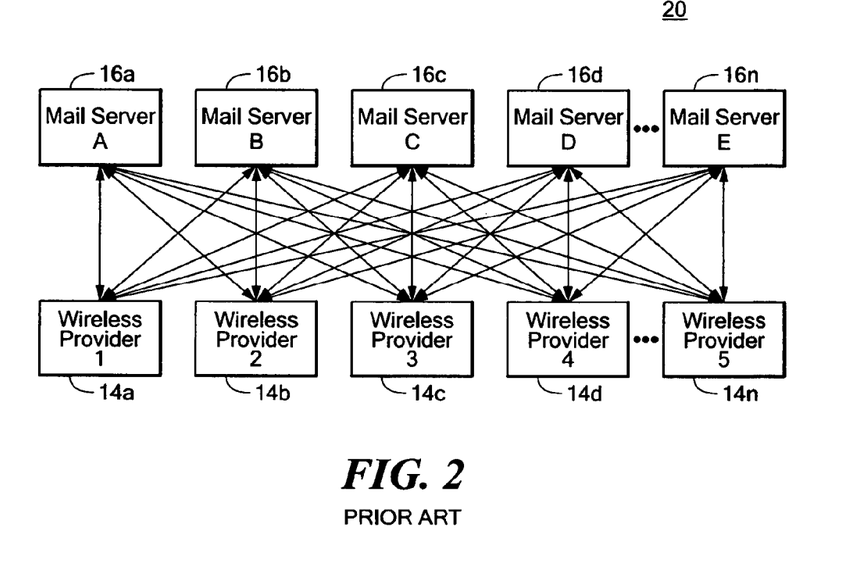
FIG. 2 is a schematic block diagram of a prior art system that includes multiple wireless host servers and multiple email servers.

Another drawback of the system of FIG. 1 is that if a company uses multiple wireless providers using multiple host servers 14a-14n as shown in FIG. 2, the multiple wireless servers may be configured to communicate with multiple email servers 16a-16n in a highly unorganized manner. Each of wireless host servers 14a-14n may need to obtain email from each of email servers 16a-16n which can dramatically reduce the amount of email that the system can process.

Figure 3:
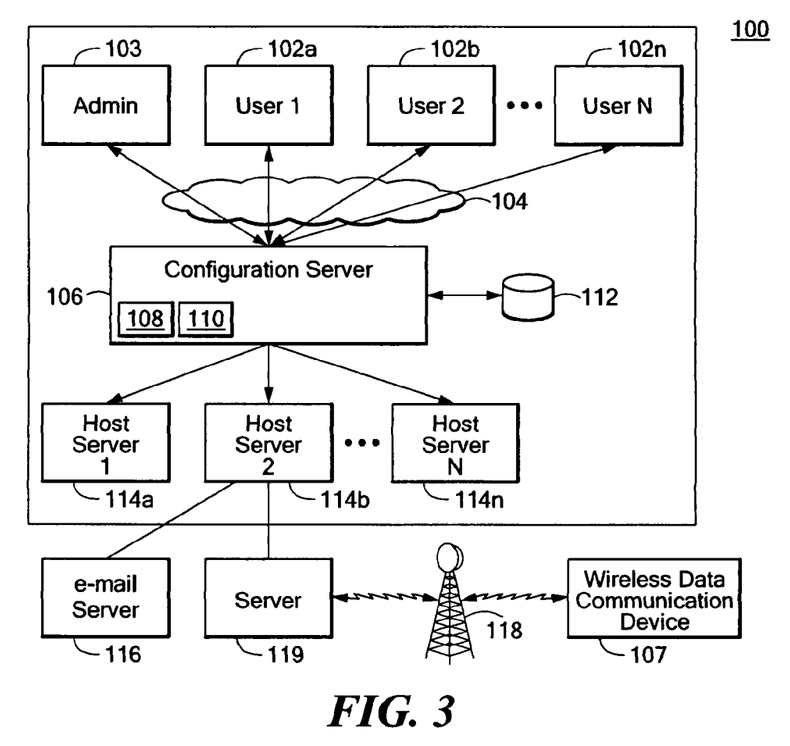
FIG. 3 is a schematic block diagram of the primary components associated with an example of a system for provisioning wireless data communication devices in accordance with the subject invention.

To overcome the disadvantages associated with the prior art, one system in accordance with the subject invention is shown in FIG. 3 for provisioning wireless data communication devices for a plurality of users. System 100 allows a plurality of users at remote terminals 102a-102n to access a configuration server 106 through a network 104 such as the Internet, an intranet or a computer network. Configuration server 106 provides a network portal for the plurality of users 102a-102n to allow each of them to provision a wireless communication device 107. Configuration server 106 includes software code executable thereon that includes authorization program 108 and configuration manager program 110. Configuration server 106 is also coupled to a database 112 that stores the configurations of each of a plurality of wireless host servers 114a-114n. Authorization program 108 provides a function of validating for each user which of the plurality of wireless host servers 114a-114n the user is authorized to use and have their wireless data communication device provisioned. After authorization, program 108 determines that a user is authorized to have their device provisioned for a host server, 20 such as host server 114a, and configuration program 110 is configured to provision the wireless communication device 107 to communicate with wireless host server 114a to obtain email from one of a plurality of messaging or email servers. For example, configuration program 110 may configure wireless communication device 107 to communicate with wireless host server 114b to obtain email from messaging server 116. Messaging server 116 may be or include an email server.

Thus, after a user provisions a wireless data communication device 107, the user will be able to access a host server such as host server 114b and messaging server 116 by wirelessly communicating through remote antennae 118. Antennae 118 communicates with server 119 to access host server 114b, which in turn obtains email from email server 116.

Figure 4:
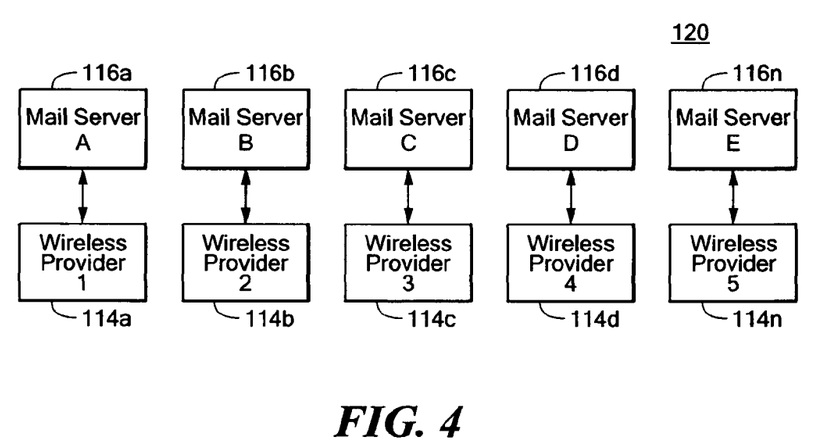
FIG. 4 is a schematic block diagram of a system that includes multiple wireless host servers and multiple email servers that have been optimized by the subject invention.

One advantage of subject invention is that when system 100 is used to configure a plurality of wireless data communication devices 107 such that they communicate with 10 one of wireless host servers 114a-114n to obtain email from a specific messaging server 116a-116n as shown in FIG. 4, communication is greatly optimized. Each wireless host server 114a-114n obtains email from a specific messaging server 116a-116n. This optimized configuration, which can be obtained by using the subject invention, allows each wireless server 114a-114n to have a high capacity for both the number of users on each of these servers and the communication data throughput.

Figure 5:
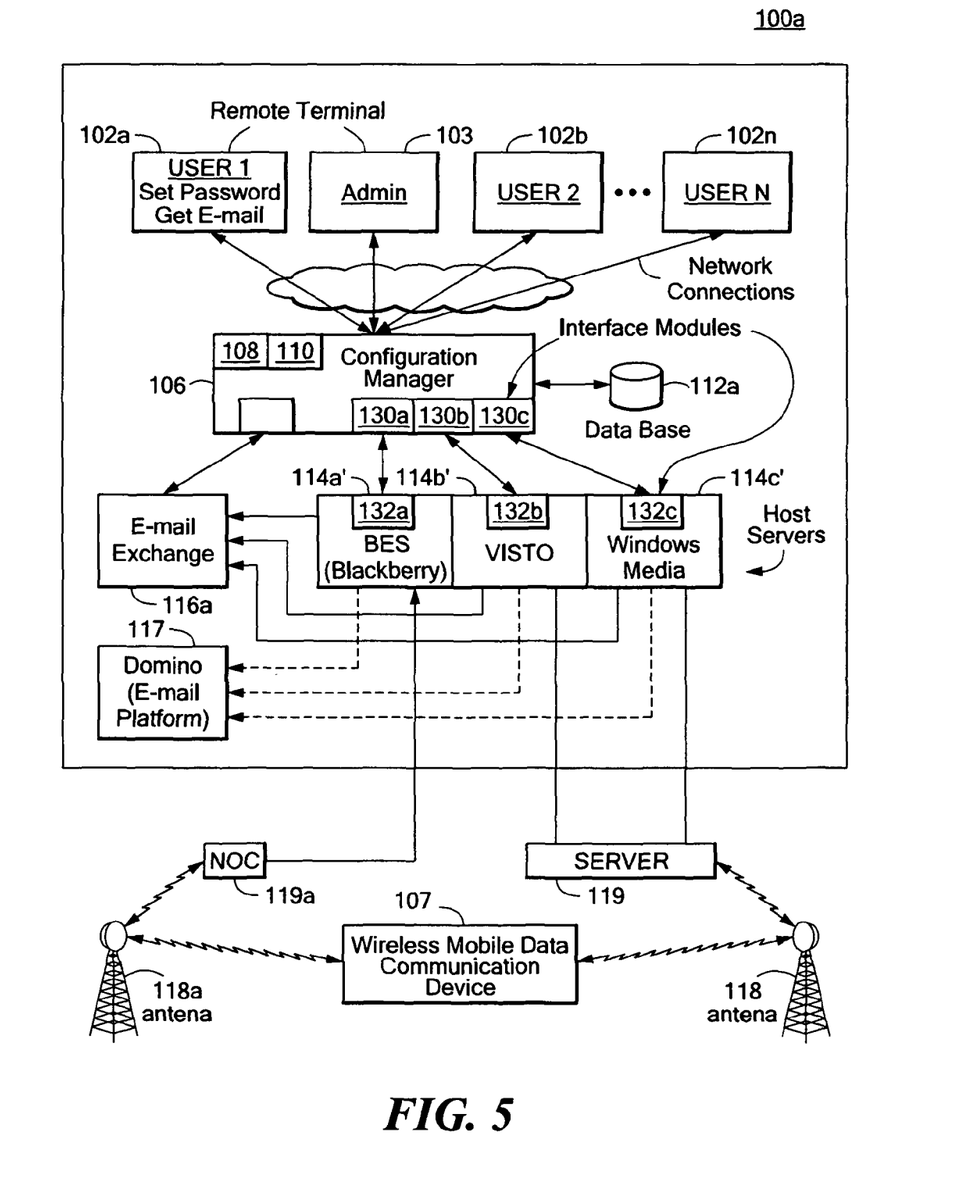
FIG. 5 is a more detailed block diagram of the system shown in FIG. 3.

A more detailed embodiment of the system 100a for provisioning a wireless data communication device is shown in FIG. 5. The host servers of system 100a may be configured to operate wireless host services such as the Blackberry service observer 114a', the Visto wireless service on server 114b' or the Windows Mobile service on server 114c'. Servers 114a'-c' may be at the same location as server 106 or may each be at a remote location. Although servers 114a'-c' are shown as being connected to configuration server 106, it is not a necessary limitation of this invention that servers 114a'-c' be connected to server 106 to provision a wireless communication device since any necessary information required to provision such a device may be stored on server 106 or database 112a coupled to server 106. Server 106 includes interfaces 130a-c to interface with servers 114a'-c'. Servers 114a'-c' may each have thereon an interface program 132a-c, respectively, for interfacing with server 106. For example, server 114a' includes 5 interface program 132a that is configured to use a Blackberry Resource Kit (BRK). Messaging server •116a, which may be an email server, may be configured to operate using Microsoft Exchange. Email platform 117 communicates with each of wireless host servers 114a'-c'.

Configuration server 106 also includes a rules manager program for determining which wireless host server and which messaging server the wireless data communication device is to be provisioned for. The rules for each of the wireless host servers and the messaging servers will be stored on database 112a. Database 112a may reside on server 106 or maybe located external to it. Configuration server 106 also includes software configured to create and manage email accounts.

Figure 6:
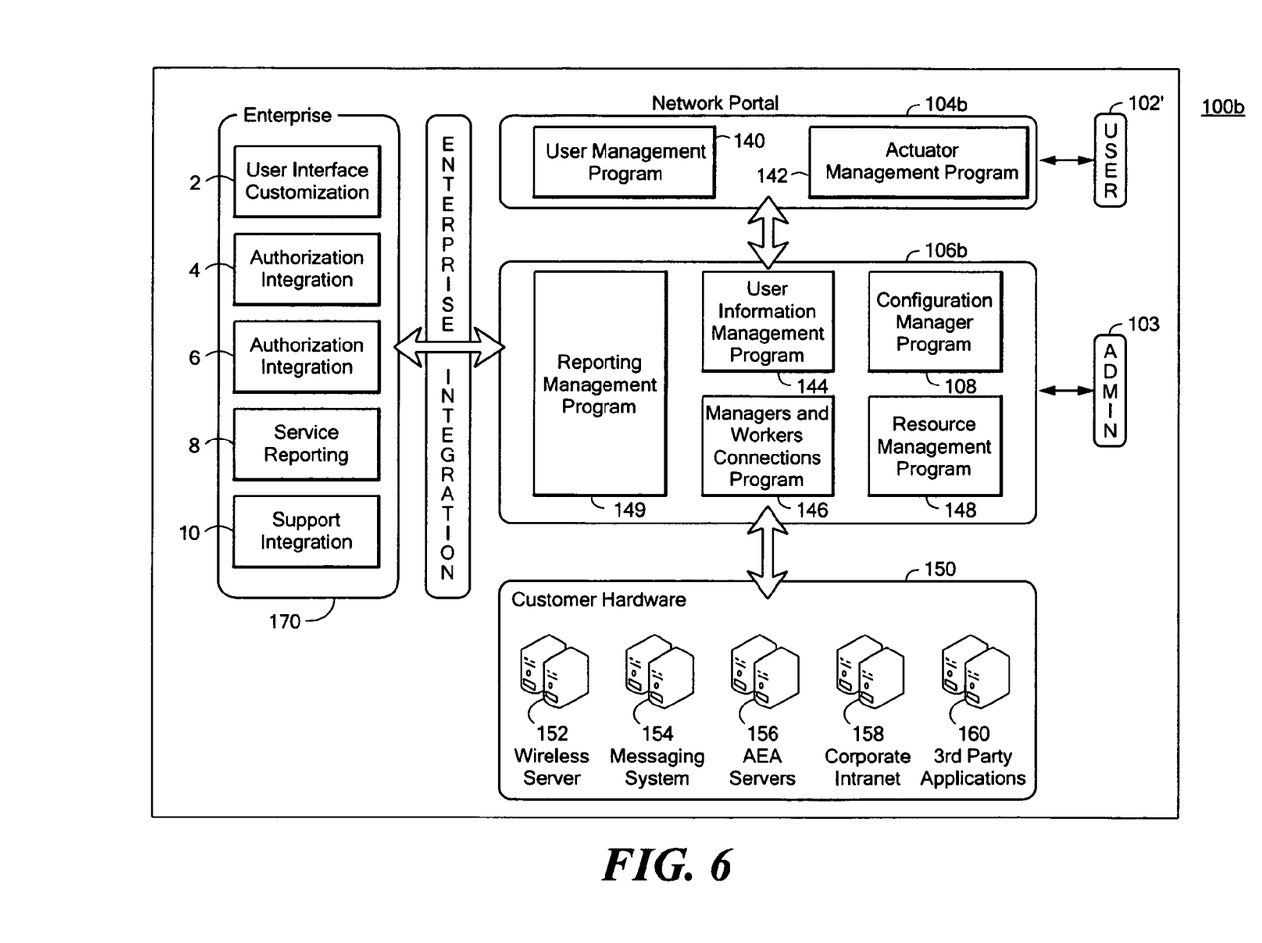
FIG. 6 is another block diagram of the system shown in FIG. 3.

Another embodiment of the system 100b, FIG. 6, for provisioning a wireless data communication device illustrates some of the functions of the system. System 100b includes network portal 104b that includes user management program 140 that manages the personal and contact information of each of the users and account management program 142 that manages the account information of each of the users. Configuration server 106b includes user information management program 144, messaging and wireless connectors program 146, resource management program 148, and reporting management program 149. Resource management program 148 manages and allocates the resources of the wireless host servers and email servers. For example, resource management program 148 may evaluate the performance of the plurality of wireless host servers and the plurality of email servers to determine how to allocate resources. Reporting management program 149 generates and provides reports to the user or administrator.

Server 106b may also communicate with the customer hardware 150 such as wireless host server 152, email server 154, also referred to as a messaging system server, configuration management server 156, Intranet server 158 and server 160 for third party software applications. Configuration server 106b may include software configured to install the third party software from server 160 on the wireless data communication devices. The third party software may include, for example, global positioning system program, a dictionary program, a time sheets program, an expense reporting program, and/or a stock quotes program. Configuration server 106b may provide to the users the service of monitoring the licenses of the third party software installed on the wireless data communication devices.

Configuration server 106b may also provide other services to the users including obtaining Internet domain names for the users, configuring the wireless data communication device to communicate using voice-over-Internet protocol, allowing a user to change or reset a password, or a user to erase or "wipe" software from the device.

Through the use of the subject invention, system 100b may provide such functions to a company such as user interface customization 172, authorization integration 174, authentication integration 176, service reporting 178 and support integration 180. A company can customize each of these services to meet its needs.

Figure 8:
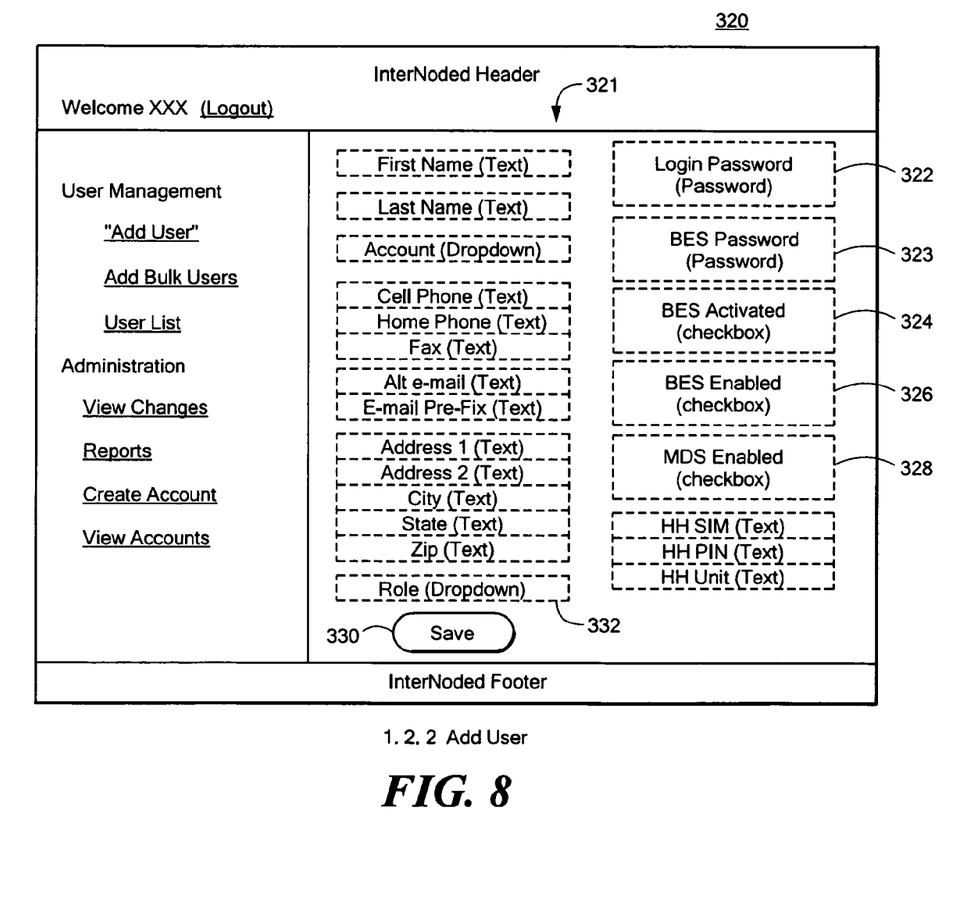
FIG. 8 is a view of an exemplary software program interface that shows a screen for adding a user for the program of FIG. 7.

The software on configuration server 106 may include an exemplary software interface 300 such as that shown in FIG. 8. Software interface 300 provides a network portal to administrators 103 at a remote terminal and also to users 102a-102n. Using software interface 300, an administrator will be able to add a user to their account using link 302, can add a plurality of users using link 304 entitled "Add Bulk Users", or can view a list of all users in the account using link 306. Also using software interface 300, an administrator may make and view changes by selecting link 308, may be able to view a report having information about the users using link 310, will be able to create an account for a new customer using link 312 or will be able to view any number of different accounts using link 314. Users 102a-102n of system 100, FIG. 3, may also be provided with software interface 300, but some or all of the links or fields may be hidden from the user to provide security for system 100.

If a user or administrator selects link 302 to add a user, the user or administrator is directed to software program interface 320, FIG. 8. Software interface 320 includes personal information 321 about each user such as name account number, phone numbers, email addresses and address. Software interface 320 also includes user information such as login password 322, other passwords 323 such as a BES password, check box 324 indicating whether a wireless host service, such as a Blackberry account service has been activated, check box 326 indicating whether a wireless host service has been enabled, and check box 328 indicating whether Internet/Intranet access has been enabled has been enabled. A user or administrator can select link 330 to save the user information. An administrator can select link 332 to make another user an administrator and provide them with system and administration privileges.

Figure 7:
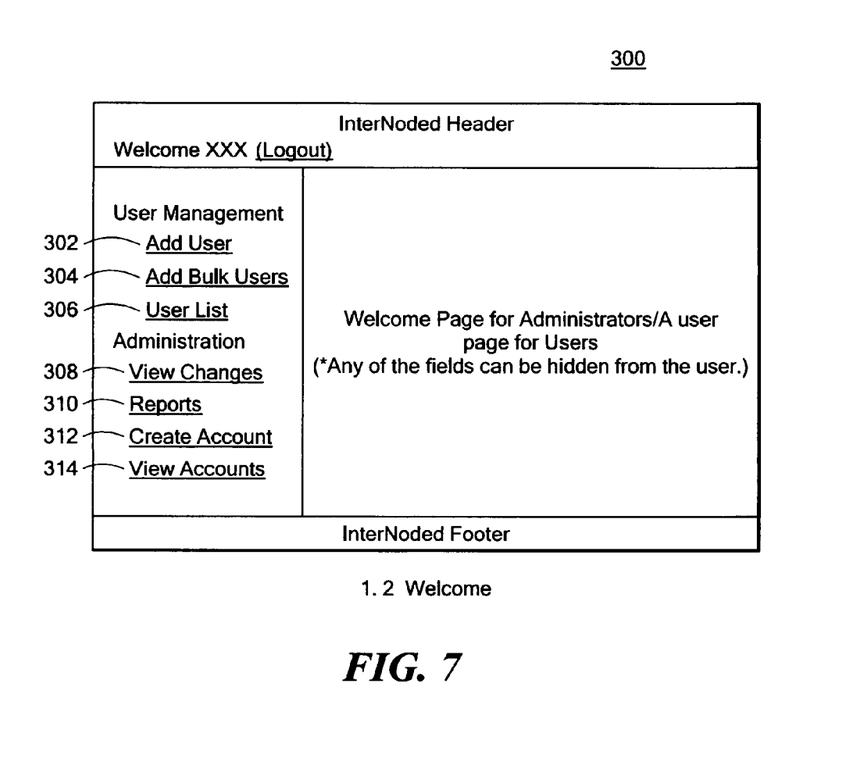
FIG. 7 is a view of an exemplary software interface for a software program used on the configuration server of FIG. 3.
Figure 9:
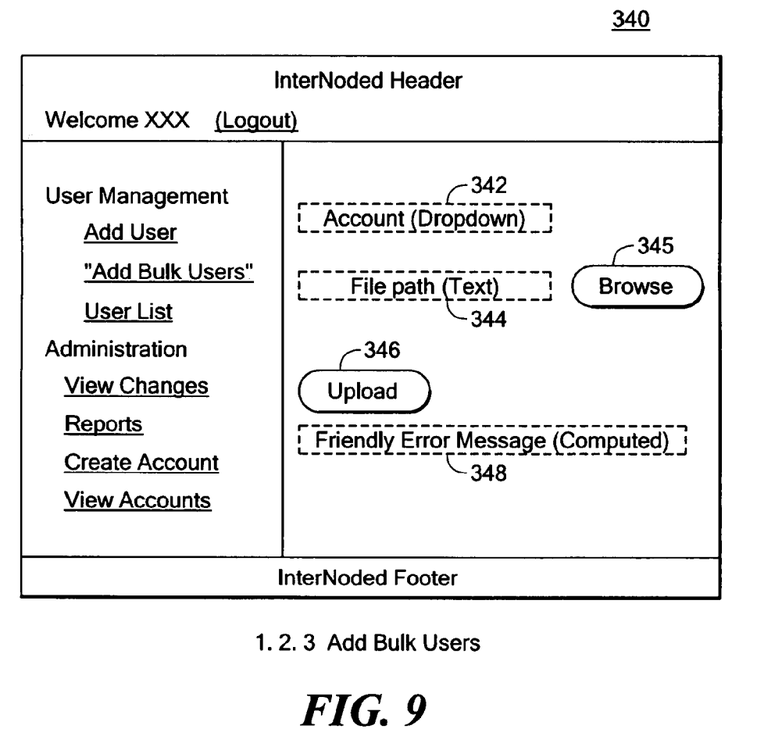
FIG. 9 is a view of an exemplary software program interface that shows information about adding bulk users for the program of FIG. 7.

By selecting link 304, FIG. 7, a user will be directed to software program interface 340, FIG. 9, which will allow an administrator to add a plurality of users at one time. With interface 340, an administrator will have access to drop down window 342 to select to which account he wishes to add the bulk users. The computer file path can be input at location 344 or link 345 can be selected to browse for a comma separated value (CSV) file on their computer. The CSV file includes the names of all bulk users that the administrator desires to add. After selecting the CSV file at location 344, an administrator can select upload link 346 to send the file to configuration server 106 for validation and creation. Also when link 346 is selected, the system checks the format of each of the users to ensure that there are no errors in the format of the CSV file. If there are no errors in the CSV file then each user will be populated in a user table.

Figure 10:
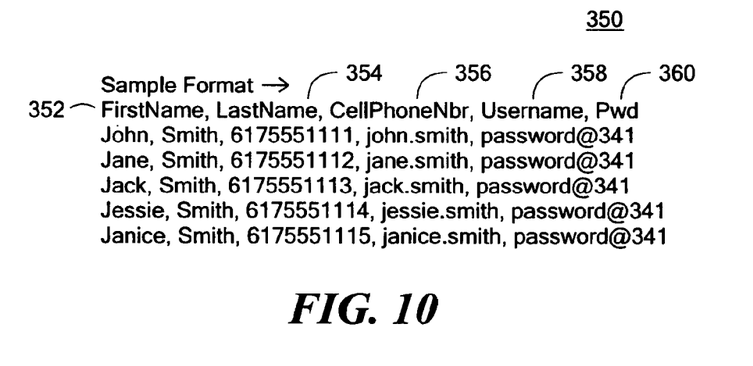
FIG. 10 is a view of a sample file format for adding bulk users as shown in FIG. 9.

A sample format for the CSV file is shown in list 350, FIG. 10. List 350 includes delineated information such as a user's first name 352, last name 354, telephone number 356, user name 358, and password 360.

Figure 11:
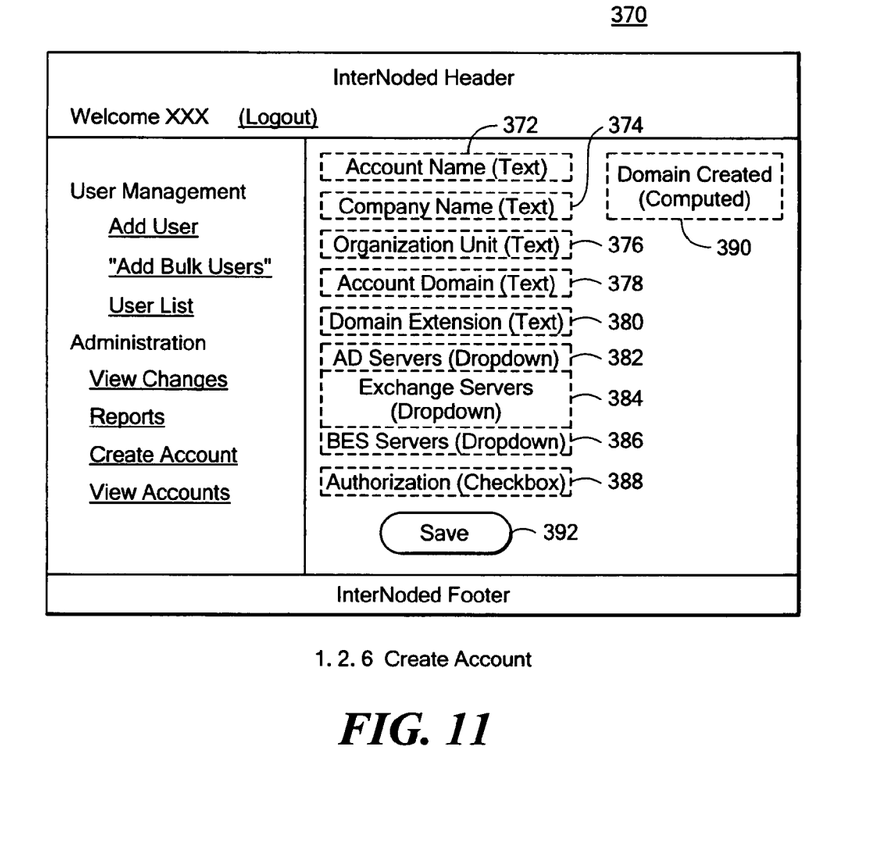
FIG. 11 is a view of a software program interface that shows information about creating an account for the program of FIG. 7.

If an administrator selects link 312 in FIG. 7 to create an account, the administrator is provided with software program interface 370, FIG. 11. Program interface 370 allows an administrator to provide information to create an account. This information can include the account name 372, the company name 374, and the organizational unit 376, the account domain 378, the domain extension 380, directory servers 382, exchange servers 384, BES servers 386 and a checkbox 388 to indicate whether a user has the authorization to provision a device themself. After an administrator has input the preceding information into interface 370, the administrator can select link 390 to perform a check to verify that a new account has been created. During the entry of information on interface 370, the administrator can select link 392 to save the information that the administrator has input.

Figure 12:
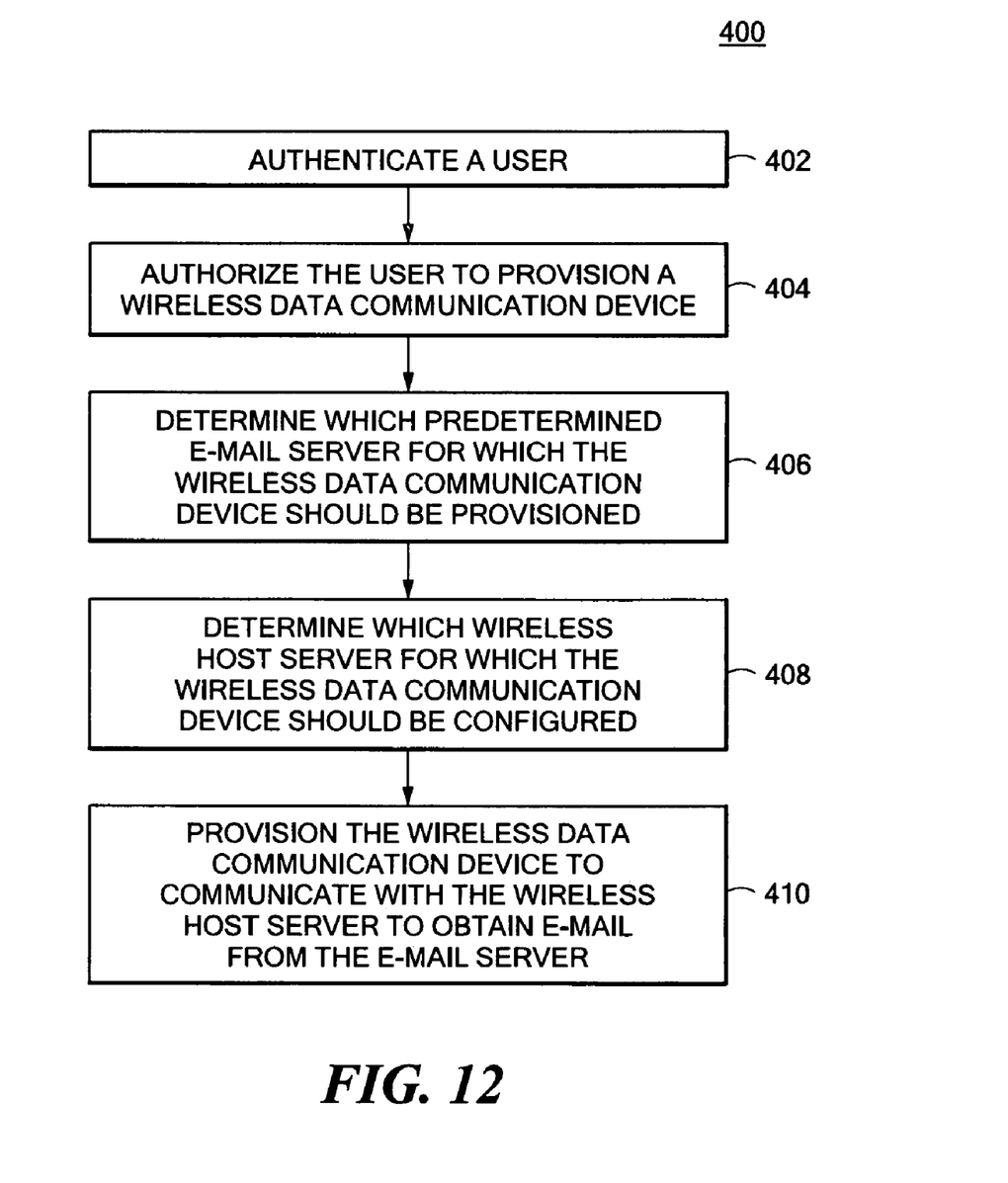
FIG. 12 is a flowchart including the primary steps associated with an example of a method of provisioning wireless data communication devices for a plurality of users in accordance with another embodiment of the invention.

One method 400, FIG. 12 for provisioning wireless data communication devices for a plurality of users begins at step 402 with authenticating a user. This can be accomplished by having the user logon to the system and provide a username and password for the system to authenticate. At step 404, the system determines if the user is authorized to provision a wireless data communication device. The system can determine this by checking the username against a database of users to determine if the user is authorized to provision one or more wireless devices. At step 406, the system determines which predetermined email server among a plurality of email servers to which the wireless data communication device should be provisioned. The system can determine this by checking a database to determine which email host server, if any, the user is authorized to provision a wireless device for. At step 408, the system determines which wireless host server among a plurality of wireless host servers to which the wireless data communication device should be configured. The system can determine this by checking which wireless host server is associated to the selected email server. At step 410, the system provisions the wireless data communication device to communicate with the wireless host server to obtain email from the email server.

The methods of the present invention can be performed with a server or computer and computer software installed thereon that has instructions to perform the steps of the invention. Alternatively, methods of the present invention can be performed with equipment that has installed hardware or firmware having instructions to perform the steps of the invention. Software used with embodiments of the present invention can be stored on computer readable medium for storing data, such as, for example, but not limited to, floppy disks, magnetic tape, zip disks, hard drives, CD-ROM, optical disks, or a combination of these.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims:

What is claimed is:

1. A system for provisioning wireless devices comprising:
   a configuration server coupled to a network and providing a portal allowing a wireless data communication device to be provisioned, the configuration server including:
   an authorization program executing thereon for validating which of a plurality of wireless host servers wireless data communication device is authorized to use;
   a configuration program executing thereon provisioning the wireless data communication device to communicate with a selected one of the plurality of wireless host servers to obtain email from one of a plurality of messaging servers; and
   a storage having data stored thereon, said storage accessible by said server for storing configurations for each of the plurality of wireless host servers.

2. The system of claim 1 wherein said storage comprises a database of information that includes rules for each of the wireless host servers and a rules manager program for determining which wireless host server and which messaging server the wireless data communication device is to be provisioned for.

3. The system of claim 1 in which there are a plurality of wireless communication devices and each of the devices is configured to communicate with the same messaging server through one of the plurality of wireless host servers.

4. The system of claim 1 further comprising software configured to create and manage email accounts.

5. The system of claim 1 further comprising the plurality of wireless host servers.

6. The system of claim 1 further comprising the plurality of messaging servers.

7. The system of claim 1 further comprising a plurality of interface modules, one associated with each of the wireless host servers, said plurality of interface modules interfacing the configuration server with each of the wireless host servers.

8. The system of claim 1 in which said configuration program configures the wireless data communication device to communicate with only one of a plurality of wireless host servers to obtain email from only one of a plurality of messaging servers.

9. The system of claim 1 in which the plurality of messaging servers each includes an email server.

10. The system of claim 1 wherein the plurality of wireless host servers are physically separate devices.

11. The system of claim 1 wherein the plurality of messaging servers are physically separate devices.

12. A system for provisioning wireless devices comprising:
    a configuration server coupled to a network and providing a portal allowing a wireless data communication device to be provisioned, the configuration server including:
    an authorization program executing thereon for validating whether the wireless data communication device is authorized to use a wireless host server;
    a configuration program executing thereon provisioning the wireless data communication device to communicate with the wireless host server to obtain email from one of a plurality of messaging servers; and
    a storage having data stored thereon, said storage accessible by said server for storing configurations for the wireless host server.

13. The system of claim 12 wherein said storage comprises a database of information that includes rules for the wireless host server and a rules manager program for determining which messaging server the wireless data communication device is to be provisioned for.

14. The system of claim 12 in which there are a plurality of wireless communication devices and each of the devices is configured to communicate with the same messaging server through the wireless host server.

15. The system of claim 12 further comprising software configured to create and manage email accounts.

16. The system of claim 12 further comprising a plurality of wireless host servers.

17. The system of claim 16 further comprising a plurality of interface modules, one associated with each of the wireless host servers, said plurality of interface modules interfacing the configuration server with each of the wireless host servers.

18. The system of claim 16 in which said configuration program configures the wireless data communication device to communicate with only one of a plurality of wireless host servers to obtain email from only one of a plurality of messaging servers.

19. The system of claim 12 in which the plurality of messaging servers each includes an email server.

20. The system of claim 12 wherein the plurality of messaging servers are physically separate devices.

* * * * *